United States Patent

Heydenreich et al.

[11] 3,743,063
[45] July 3, 1973

[54] DRUM BRAKE FOR VEHICLES

[75] Inventors: Richard Heydenreich, Riemerling; Hans-Günther V. D. Marwitz; Hubert Blechschmidt, both of Munich, all of Germany

[73] Assignee: Bayerische Motoren Werke Aktiengesellschaft, Munich, Germany

[22] Filed: Apr. 26, 1971

[21] Appl. No.: 137,476

[30] Foreign Application Priority Data
Apr. 28, 1970 Germany................. P 20 20 668.2

[52] U.S. Cl............ 188/218 R, 188/79, 188/264 R, 192/113 A
[51] Int. Cl............................................. F16d 65/10
[58] Field of Search .................. 188/218 R, 264 R, 188/79; 192/113 A

[56] References Cited
UNITED STATES PATENTS
2,265,938  12/1941  Eksergian................. 188/218 R X
1,957,654  5/1934  La Brie.......................... 188/264 R
2,284,357  5/1942  Ash.............................. 188/264 R X
3,043,630  7/1962  Heitzman..................... 188/264 R X FOREIGN PATENTS OR APPLICATIONS
559,716  9/1932  Germany........................ 188/264 R
545,558  3/1932  Germany .............................. 188/79
691,518  5/1940  Germany........................ 188/264 R Primary Examiner—George E. A. Halvosa
Attorney—Craig, Antonelli & Hill

[57] ABSTRACT

A device for venting drum brakes for vehicles, especially motorcycles, in which the brake drum essentially consists of two axially divided drum halfs connected with each other, whereby at least in one of the two mutually facing regions of the drum halves essentially radially directed air cooling ducts are provided whose air inlets are arranged within a region, as close as possible to the axis of the drum, and whose air outlets are arranged within a region that is as far as possible from this axis.

31 Claims, 5 Drawing Figures

PATENTED JUL 3 1973          3,743,063

INVENTORS
RICHARD HEYDENREICH
HANS-GUNTHER v.d. MARWITZ
HUBERT BLECHSCHMIDT
BY:
Craig, Antonelli & Hill
ATTORNEYS INVENTORS
RICHARD HEYDENREICH
HANS-GUNTHER v.d. MARWITZ
HUBERT BLECHSCHMIDT
BY:

Craig, Antonelli & Hill
ATTORNEYS

DRUM BRAKE FOR VEHICLES

The present invention relates to a device for the ventilation of drum brakes for vehicles.

In the case of brakes subjected to high stress such as in motorcycles, the high thermal expansion of the brake drums may cause fading problems despite the fact that the brake drum is exposed, since the brake shoes themselves are substantially closed-off from the cooling air. It is therefore attempted to improve the rapid dissipation of heat from the brake by deliberate guidance of the cooling air. In the hitherto known constructions, it is attempted to do so either by stationary air scoops on the brake carrier plate or by air guide plates or the like rotating with the brake drum.

However, these constructions have the main disadvantages that owing to necessary compromises in the construction of the air guide openings the actually usable dynamic pressure remains low and thus the brake is not effectively ventilated.

In contrast, the present invention has as its object to provide a ventilated drum brake in which by a clearly definable fan effect, a forced ventilation of the brake shoes and/or brake drums is obtained so that existing fading problems are eliminated or reduced.

As a solution to the underlying problem the invention proposes in connection with a drum brake of the type described hereinabove that the brake drum consists of two axially divided drum halves which are connected to one another, whereby substantially radially directed cooling air ducts are arranged in at least one of the mutually facing regions of the drum halves, whose cooling air inlet is arranged in a region as near the axis of the drum as possible and whose air outlet is arranged in a region as far from this axis as possible.

It is proposed in one embodiment of the present invention that in the two mutually facing regions of the drum halves, cooling air ducts may be arranged which communicate by way of substantially axially disposed air guides with axially directed air inlet apertures which, in their turn, are in communication with the outside air by way of labyrinth-like air guides, apertures or the like in the brake carrier plates shielding the drum halves relatively to the exterior.

The invention also proposes that the drum halves are produced as castings or forgings and are connected to one another by high-strength gluing and/or riveting.

The advantages of the present invention are seen to reside chiefly in the fact that owing to the construction of the brake drum as a centrifugal fan or blower, the rate of air flow or the pressure effect of the fan rotor can be reliably predetermined and therefore move particularly at high speeds a good cooling effect is obtained at the brake shoes and brake drums. Thus, even in the case of brakes subjected to high stresses the recurring fading problems and therewith the slackening of the braking effect can be obviated to a very considerable extent.

A further advantage of the present invention resides in that owing to the subdivision of the brake drum into two castings or forgings, on the one hand, these parts can be manufactured in a simple manner and, on the other hand, permit an optimum formation and configuration of the air guide ducts.

Moreover, the additional ducts discharging according to the present invention substantially radially into the cooling air ducts within the ribs in the immediate vicinity of the braking surfaces, advantageously serve to discharge abraded material produced by braking operations and for direct ventilation of the brake shoes, whereby the cooling air enters into the interior of the brake through the gap between the drum halves and the brake carrier plates.

These and further objects, features and advantages of the present invention will become more apparent from the following description when taken in connection with the accompanying drawing which shows, for purposes of illustration only, two embodiments in accordance with the present invention and wherein.

Figure 1:
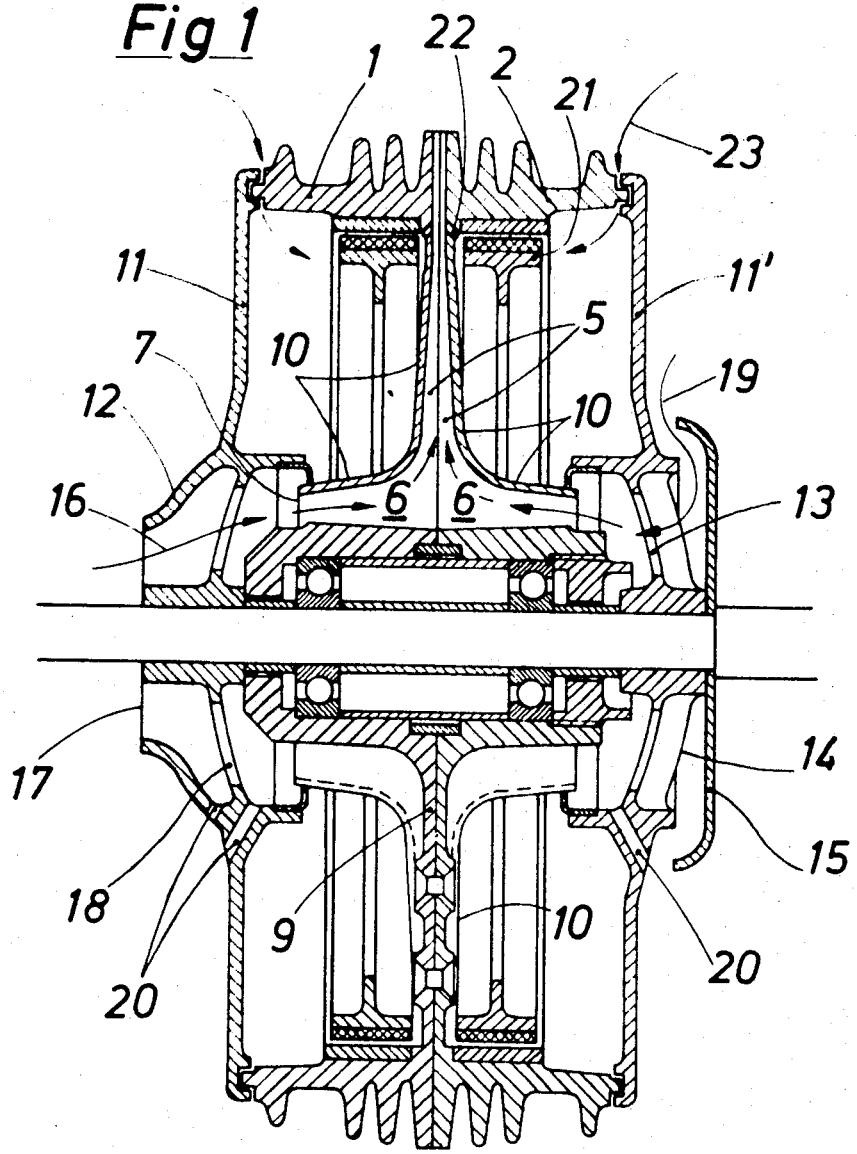
FIG. 1 is a cross-section through one embodiment of double drum brake made in accordance with the present invention.
Figure 2:
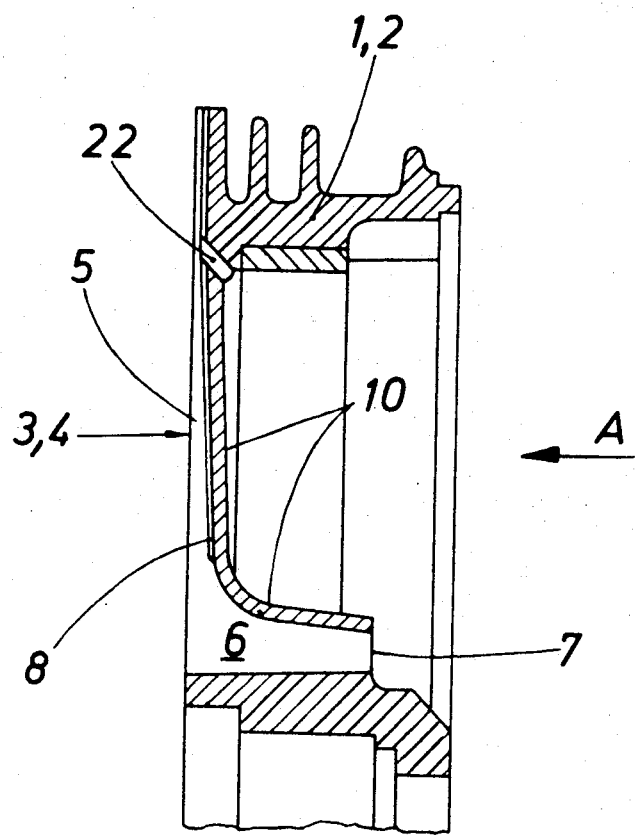
FIG. 2 is a partial cross-sectional view through a drum half drawn on a larger scale.
Figure 3:
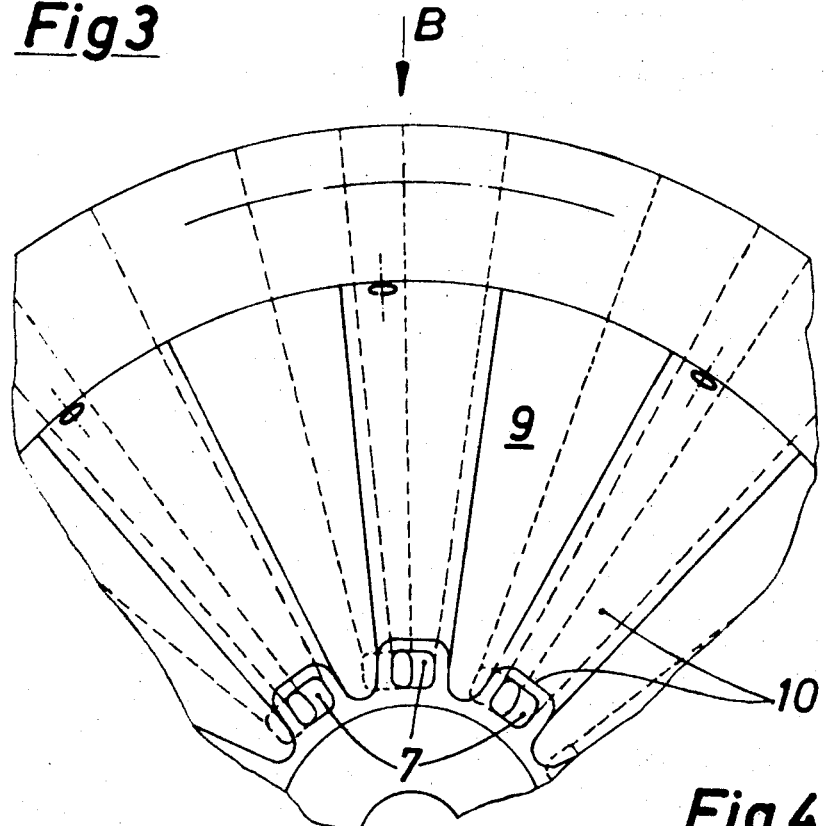
FIG. 3 is a partial view of a drum half according to FIG. 2, looking in the direction of the arrow A.
Figure 4:
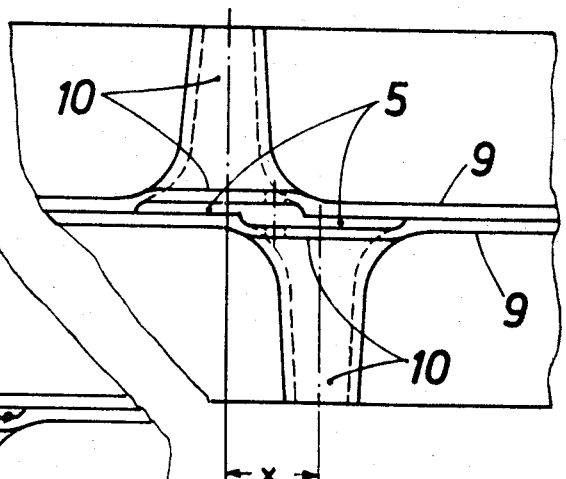
FIGS. 4 and 5 are partial views of two different embodiments of cooling air ducts, as viewed in the direction B of FIG. 3.

Referring now to the drawing wherein like reference numerals are used throughout the various views to designate like parts, the double drum brake comprises substantially two axially divided drum halves 1 and 2 which are produced as castings or forgings and which are connected to one another by riveting and/or may be secured together by the use of high-strength adhesives. Substantially radially directed cooling-air ducts 5 are arranged in the two mutually facing regions 3 and 4 of the drum halves 1 and 2, whose air inlet is arranged in a region as near to the axis as possible and whose air outlet is arranged in a region as far from the axis as possible. In the example shown in the drawing, the cooling air ducts 5 communicate by way of substantially axially disposed air guides 6 with axially directed air inlet apertures 7, so that the two drum halves 1 and 2 connected to one another form, together with the air guides 6 and the cooling air ducts 5, a centrifugal fan or blower.

Figure 5:
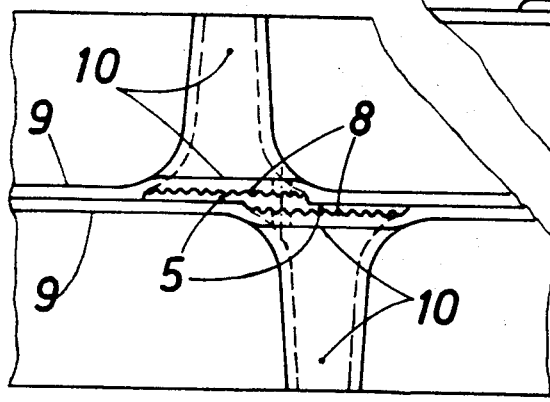

The two drum halves 1 and 2 in the assembled state are offset relative to one another in the peripheral direction, for example by an amount x, so that the surface over which cooling air passes is substantially increased and thus a better cooling of the two drum halves 1 and 2 is achieved. The cooling surfaces can be further increased by arranging, as shown in FIG. 5, cooling ribs 8 which extend radially in the cooling air ducts 5 and which preferably terminate approximately in the region of the transition from the radial to the axial portions of the cooling air guides in the drum halves 1 and 2.

According to an embodiment of the present invention which is not illustrated in the drawings, the cooling ribs may also be arranged only at one of the drum halves in the region of the cooling air ducts which overlap one another. In this case the cooling ribs may be substantially higher.

The cooling air ducts 5 and the air guides 6 extend in ribs 10 projecting from the basic contour 9 of the respective drum half 1 and 2. The air inlet apertures 7 communicate with the outside air through labyrinth-like air guides in the brake carrier plates 11, 11' which shield the drum halves 1 and 2 relatively to the exterior.

FIG. 1 shows two different constructional possibilities for the supply of outside air to the air inlet apertures 7, to be described more fully hereinafter, though it is understood that in actual practice the same type of construction for the supply of the air to the air inlet apertures may be used in one and the same brake.

To prevent the penetration of dirt, water and the like, the brake carrier plate 11 includes a cup-shaped nose 12. Thus there is provided in the brake carrier plate 11 an air guide 16, whereby the air enters at the annular inlet aperture 17 and reaches by way of holes 18 to the air inlet apertures 7 in the drum half 1.

For the removal of waste material produced by abrasion in braking operations and for direct ventilation of the brake shoes 21 additional ducts 22 are provided in the ribs 10 in the immediate vicinity of the brake shoes 21; the additional ducts 22 thereby discharge substantially radially into the cooling air ducts 5. The suction effect in the cooling air ducts 5 causes fresh air to flow as indicated by arrows 23 by way of the labyrinth-like gap between the drum halves 1 and 2 and the stationary brake carrier plates 11, 11', respectively, into the interior of the brake. From there the cooling air flows by way of the brake shoes and the additional ducts 22 into the cooling air ducts 5 and in so doing conveys abraded brake shoe material into the free atmosphere. This is further enhanced by the centrifugal action of the rotating drum halves.

The holes 13 and the apertures 14 in the brake carrier plate 11' may be shielded with respect to the exterior by a cup-like cover disc 15, forming an air guide 19, as also shown in FIG. 1.

To remove water or dirt which enters the brake through the air guides, as well as also any abraded brake lining material etc., which may still be present, discharge bores 20 communicating with the free atmosphere are arranged at the lowest region of the brake carrier plates 11 and 11'.

FIGS. 1 to 5 show a double drum brake as an example of the present invention. However, it is understood that the ventilating device according to the present invention could be used equally well with normal single drum brakes.

While we have shown and described only two embodiments in accordance with the present invention it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A brake drum arrangement for vehicle brakes comprising: two drum halves connected with one another along facing surface portions, said facing surface portions being substantially perpendicular to a brake drum axis extending through the center of said drum halves, radially extending cooling air duct means formed between said drum halves adjacent said facing surface portions, axially extending air inlet means for communicating outside air to a radially inner portion of said cooling air duct means, air outlet means for communicating the air in said cooling air duct means from a radially outer portion of said cooling air duct means, and pot-shaped cover disc means for covering said air inlet means to force cooling air to move radially around said cover disc means as it passes from the outside into said axially extending air inlet means.

2. An arrangement according to claim 1, wherein each of said brake drum halves is formed as a one-piece structural member, and wherein said radially extending cooling air duct means are formed by the interengagement of an open channel on at least one of said drum halves with corresponding structure on said other drum half.

3. An arrangement according to claim 1, wherein each of said drum halves include means for accommodating braking surface means, and wherein axially extending apertures communicate said cooling air duct means with said means for accommodating braking surface means.

4. An arrangement according to claim 3, wherein said apertures are spaced radially outwardly of said air inlet means.

5. A device for the ventilation of drum brakes for vehicles, characterized in that the brake drum comprises two substantially radially divided, axially aligned drum halves which are connected to one another along mutually facing regions, in that substantially radially directed cooling-air duct means are arranged in at least one of the mutually facing regions of the drum halves which are provided with cooling air inlet and outlet means, the cooling air inlet means being arranged in a region relatively near to the axis of the drum and the air outlet means being arranged in a region relatively far from said axis, in that cooling air duct means are arranged in the two mutually facing regions, which duct means communicate by way of substantially axially disposed air guide means with substantially axially directed air inlet apertures, in that the air inlet apertures communicate with the outside air by way of an air guide means which extends through holes and an annular aperture in a cup-shape nose provided on a brake carrier plate, and in that the annular air inlet and the holes are covered by a pot-shaped cover disc, the air inlet apertures communicating with the outside air by way of a labyrinth-like air guide means.

6. A device according to claim 5, characterized in that in the assembled condition of the drum halves the cooling air channel means are offset relative to one another in the peripheral direction.

7. A device according to claim 5, characterized in that the cooling air channel means and the air guide means are arranged in rib like means which project from the contour of the drum halves.

8. A device according to claim 7, characterized in that in the mutually overlapping regions of the cooling air channel means, radially directed cooling rib means are provided at least at one of the drum halves.

9. A device according to claim 8, characterized in that substantially radially disposed cooling rib means are arranged in the cooling air channel means of both drum halves.

10. A device according to claim 9, characterized in that additional duct means are provided in the rib-like means in the immediate vicinity of the brake shoes, said additional duct means discharging substantially radially into the cooling air duct means.

11. A device for the ventilation of drum brakes for vehicles, characterized in that a brake drum is substantially radially divided into two drum halves which are axially aligned and connected to one another with substantially radially extending central web portions in face-to-face relationship, and in that substantially radially directed channel means of open cross-section are arranged in the surface of the web portion of at least one drum half which faces the web portion of the other drum half, the open side of said channel means being closed by the surface of the web portion of the other drum half to form substantially radially directed cooling-air duct means of tubular cross section which are provided with cooling-air inlet and outlet means, the cooling-air inlet means being arranged in a region relatively near to the axis of the drum and the air outlet means being arranged in a region relatively far from said axis, said radially directed cooling-air duct means being substantially midway between said two drum halves.

12. A device according to claim 11, characterized in that discharge bores communicating with the free atmosphere are provided in the lower region of a brake carrier plate.

13. A device according to claim 11, characterized in that the drum halves are castings.

14. A device according to claim 11, characterized in that the drum halves are forgings.

15. A device according to claim 11, characterized in that the two drum halves are connected to each other by high-strength bonding.

16. A device according to claim 11, characterized in that the two drum halves are connected to each other by rivets.

17. A device according to claim 11, characterized in that substantially radially disposed cooling rib means are arranged in the cooling air channel means of both drum halves.

18. A device according to claim 11, characterized in that additional duct means are provided in rib-like means in the immediate vicinity of the brake shoes, said additional duct means discharging substantially radially into the cooling air duct means.

19. A device according to claim 11, characterized in that in the assembled condition of the drum halves the cooling air channel means are offset relative to one another in the peripheral direction.

20. A device according to claim 19 characterized in that in the mutually overlapping regions of the cooling air channel means, radially directed cooling rib means are provided at least at one of the drum halves.

21. A device according to claim 11, characterized in that the cooling air channel means arranged in the two mutually facing web surfaces communicate by way of substantially axially disposed air guide means with substantially axially directed air inlet apertures.

22. A device according to claim 21, characterized in that in the assembled condition of the drum halves the cooling air channel means are offset relative to one another in the peripheral direction.

23. A device according to claim 21, characterized in that the air inlet apertures communicate with the outside air by way of an air guide means which extends through holes and an annular aperture in a cup-shaped nose provided on a brake carrier plate.

24. A device according to claim 21, characterized in that the cooling air channel means and the air guide means are arranged in rib-like means which project from the contour of the drum halves.

25. A device according to claim 24, characterized in that in the mutually overlapping regions of the cooling air channel means, radially directed cooling rib means are provided at least at one of the drum halves.

26. A device according to claim 25, characterized in that substantially radially disposed cooling rib means are arranged in the cooling air channel means of both drum halves.

27. A device according to claim 26, characterized in that additional duct means are provided in the rib-like means in the immediate vicinity of the brake shoes, said additional duct means discharging substantially radially into the cooling air duct means.

28. A device according to claim 27, characterized in that the air inlet apertures communicate with the outside air by way of an air guide means which extends through holes and an annular aperture in the cup-shaped nose provided on a brake carrier plate.

29. A device according to claim 28, characterized in that the annular air inlet and the holes are covered by a pot-shaped cover disc, the air inlet apertures communicating with the outside air by way of a labyrinth-like air guide means.

30. A device according to claim 29, characterized in that discharge bores communicating with the free atmosphere are provided in the lower region of the brake carrier plate.

31. A device according to claim 30, characterized in that the drum halves are constructed as castings or forgings and connected to one another by high-strength bonding and/or riveting.

* * * * *